United States Patent
Stolper (10) Patent No.: US 8,706,450 B2
(45) Date of Patent: Apr. 22, 2014

(54) METHOD AND SYSTEM FOR IDENTIFICATION OF GROUPING CHARACTERISTICS

(75) Inventor: Thilo Stolper, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 854 days.

(21) Appl. No.: 12/988,721

(22) PCT Filed: Apr. 24, 2008

(86) PCT No.: PCT/EP2008/003334
§ 371 (c)(1),
(2), (4) Date: Oct. 20, 2010

(87) PCT Pub. No.: WO2009/129824
PCT Pub. Date: Oct. 29, 2009

(65) Prior Publication Data
US 2011/0040531 A1   Feb. 17, 2011

(51) Int. Cl.
*G06F 17/50* (2006.01)
*G06F 7/60* (2006.01)
*G06G 7/48* (2006.01)

(52) U.S. Cl.
USPC ........................... 703/1; 703/2; 703/6

(58) Field of Classification Search
None
See application file for complete search history.

(56) References Cited

U.S. PATENT DOCUMENTS

| | | | | |
|---|---|---|---|---|
| 5,761,664 A * | 6/1998 | Sayah et al. | | 1/1 |
| 5,813,018 A * | 9/1998 | Kaji et al. | | 715/236 |
| 5,886,702 A * | 3/1999 | Migdal et al. | | 345/423 |
| 6,262,739 B1 * | 7/2001 | Migdal et al. | | 345/423 |
| 6,285,805 B1 * | 9/2001 | Gueziec | | 382/299 |
| 6,392,647 B1 * | 5/2002 | Migdal et al. | | 345/423 |
| 6,452,604 B1 * | 9/2002 | Sato | | 345/619 |
| 6,611,267 B2 * | 8/2003 | Migdal et al. | | 345/428 |
| 6,614,430 B1 * | 9/2003 | Rappoport | | 345/420 |
| 6,629,065 B1 * | 9/2003 | Gadh et al. | | 703/1 |
| 6,828,963 B1 * | 12/2004 | Rappoport | | 345/419 |
| 6,847,384 B1 * | 1/2005 | Sabadell et al. | | 345/672 |
| 6,867,772 B2 * | 3/2005 | Kotcheff et al. | | 345/420 |

(Continued)

FOREIGN PATENT DOCUMENTS

EP   0 314 595   5/1989

OTHER PUBLICATIONS

Hofmam et al. "Organization of Large Engineering Models for Real-Time Walk-Through Rendering", 2003.*

(Continued)

*Primary Examiner* — Shambhavi Patel
(74) *Attorney, Agent, or Firm* — Cozen O'Connor (57) ABSTRACT

A method and engineering system by which relationships are automatically identifiable between CAD objects of different CAD models, where use of a transformation rule which maps points of the envelope geometry of a first CAD object of a first CAD model onto points in a second CAD model is used such that the points involved in the transformation rule each relate to the same modeled raw component. The transformation rule is applied to at least two CAD objects of the first CAD model. If the transformed points in the second CAD model are surrounded by a common-envelope geometry, this spatial relationship is interpreted as a grouping relationship. A hierarchical data structure is then formed automatically within the engineering system, taking account of the already recognized grouping relationship, and allowing synchronous data keeping.

13 Claims, 5 Drawing Sheets

(56) References Cited

U.S. PATENT DOCUMENTS

| | | | |
|---|---|---|---|
| 6,985,835 B1* | 1/2006 | Etzion et al. | 703/1 |
| 7,099,803 B1* | 8/2006 | Rappoport et al. | 703/1 |
| 7,149,677 B2* | 12/2006 | Jayaram et al. | 703/22 |
| 7,173,622 B1* | 2/2007 | McLaughlin | 345/473 |
| 7,397,473 B2* | 7/2008 | Chakraborty | 345/419 |
| 7,543,015 B2* | 6/2009 | Vion-Dury et al. | 709/200 |
| 7,698,016 B2* | 4/2010 | Jayaram et al. | 700/180 |
| 7,737,966 B2* | 6/2010 | Nishida et al. | 345/419 |
| 8,229,579 B2* | 7/2012 | Eldridge et al. | 700/31 |
| 8,305,376 B2* | 11/2012 | Ran et al. | 345/420 |
| 8,497,875 B2* | 7/2013 | Lee | 345/620 |
| 2003/0117397 A1* | 6/2003 | Hubrecht et al. | 345/420 |
| 2003/0156127 A1* | 8/2003 | Kleyman | 345/672 |
| 2004/0017385 A1* | 1/2004 | Cosman et al. | 345/629 |
| 2004/0136590 A1* | 7/2004 | Brouwer | 382/154 |
| 2005/0046624 A1* | 3/2005 | Jayaram et al. | 345/419 |
| 2010/0277476 A1* | 11/2010 | Johansson et al. | 345/423 |

OTHER PUBLICATIONS

Gottschalk et al. "OBBTree_A Hierarchical Structure for Rapid Interference Detection", 1996.*

Mun et al. "Identification of Topological Entities and Naming Mapping for Parametric CAD Model Exchanges", 2005.*

Zhuang, et al. "Simplifying Complex CAD Geometry with Conservative Bounding Contours", IEEE 1997.*

Fu et al. "An approach to identify design and manufacturing features from a data exchanged part model", Computer-Aided Design 35 (2003) 979-993.*

Erikson, Carl. "Hierarchical Levels of Detail to Accelerate the Rendering of Large Static and Dynamic Polygonal Environments", 2000.*

Cohen, Jonathan. "Concepts and Algorithms for Polygonal Simplification", 2005.*

Montagnat et al. "A Review of Deformable Surfaces: Topology, Geometry, and Deformation", Image and Vision Computing 19 (2001), 1023-1040.*

Cohen, et al. "Simplification Envelopes", 2000.*

Borouchaki et al. "Simplification of composite parametric surface meshes", Engineering with Computers (2004) 20: 176-183.*

Cera et al. "Role-based viewing envelopes for information protection in collaborative modeling", Computer-Aided Design 36 (2004) 873-886.*

* cited by examiner

METHOD AND SYSTEM FOR IDENTIFICATION OF GROUPING CHARACTERISTICS

CROSS-REFERENCE TO RELATED APPLICATIONS

This is a U.S. national stage of International Application No. PCT/EP2008/003334, filed on 4 Apr. 2008. The entire content of the application is incorporated herein by reference.

BACKGROUND OF THE INVENTION

1. Field of the Invention

The invention relates to a method and an engineering system with which relationships between Computer Aided Design (CAD) objects in different CAD models can be automatically identified. The invention is of use particularly in interactive planning and engineering processes in which CAD models are produced at different levels of abstraction.

2. Description of the Related Art

The use of CAD, Computer Aided Engineering (CAE) or Computer Aided Manufacturing (CAM) programs is widespread in the field of digital product and factory planning. In the planning, manufacture, and down to any maintenance tasks which may arise, an attempt is made to provide an information-technological accompaniment for the life cycle of a product, over its complete life cycle. In doing so, the aim is for an integrated approach, in which the data storage is as far as possible uniform, from planning, through realization, control and ongoing improvements of all the important factory processes and resources connected with the product.

Correspondingly, during the planning process described above many CAD models are produced for individual special domains, such as factory planning, assembly instructions or simulations. Here, the CAD models are optimized for the purpose of their particular use. The applications employed for this often also require data from other applications which work with CAD models. To make this possible, it is desirable that the data from the various source systems, which are used in a planning process, is brought together centrally and stored in synchronized form. To this end, engineering systems at a higher level than the individual sources systems are employed. Within these engineering systems, the user has an option to build up a so-called resource structure. This resource structure consists of resource labels, which are assigned to each of the CAD objects concerned, and with which the user can access these CAD objects. If, for example, the same physical component is modeled by two different CAD objects, which in some circumstances originate in different CAD systems, then the user can assign a shared resource label to both these CAD objects. In this way, the two CAD objects are brought together in the engineering system, thereby making it possible to synchronize the data which underlies the CAD objects.

If an industrial automation system is being planned with the tools of a digital factory, then the physical components used give rise to CAD models at various levels of abstraction. At a very early phase of the planning, extensive systems are often represented by a CAD object which is still relatively coarse in nature. As the planning phase proceeds, this CAD object is then often specified more precisely in that individual components of the system which is being modeled are each represented by a CAD object which is richer in detail. In many cases, this will be achieved using a CAD tool other than that which was used in the early phase of the project.

Consequently, in the course of such a planning operation, new CAD objects are produced which have, along with the coarser CAD objects generated at the start, a sort of group relationship based on the spatial connection between the components modeled. A user who identifies such a group relationship now has the possibility to make such knowledge accessible to an engineering system. The user can thus, for example, within the engineering system set up a resource for the system which is to be modeled and, subordinate to this, define sub-resources assigned to the relevant components of the automaton system that are modeled by CAD objects.

SUMMARY OF THE INVENTION

It is thus an objective of the invention to enable, in a simple way, the unified storage and synchronization of data in an engineering system that is hierarchically superior to various CAD systems.

This and other objects and advantages are achieved in accordance with the invention by a method for the computer-assisted, automated hierarchical assignment of CAD objects, in a first CAD model of an automation technology system, to CAD group objects in a second CAD model of the automation technology system with the help of an engineering system that is equipped for hierarchically structured data management for the CAD objects and CAD group objects where, for the purpose of implementing the method, use is made of a transformation methodology which maps points on a component of the automation technology system, modeled in the first CAD model, onto points of the same component in the second CAD model. The method includes application of the transformation methodology to at least one first point of a first envelope geometry of a first CAD object that represents a first automation component in the first CAD model to calculate a second point in the second CAD model and to at least one third point of a second envelope geometry of a second CAD object that represents a second automation component in the first CAD model to calculate a fourth point in the second CAD model, checking for the existence of a grouping relationship, which is deemed to be satisfied if the second and fourth points are arranged within a third envelope geometry of a CAD group object in the second CAD model and, if this group relationship exists, creation of a hierarchical ordering within the engineering system, in which the first and the second CAD objects are hierarchically subordinate to the CAD group object.

Further, this objective is achieved by an engineering system for the computer-assisted automated hierarchical assignment of CAD objects, in a first CAD model of an automation technology system, to CAD group objects in a second CAD model of the automation technology system, where the engineering system is equipped for hierarchically structured data management of CAD objects and CAD group objects, and where the engineering system is equipped to use a transformation methodology which maps points, on a component of the automation technology system modeled within the first CAD model, onto points of the same component in the second CAD model. The engineering system includes a facility for applying the transformation methodology to at least one first point of a first envelope geometry of a first CAD object, which represents a first automation component in the first CAD model, to calculate a second point in the second CAD model, and to at least one third point of a second envelope geometry of a second CAD object which represents a second automation component in the first CAD model to calculate a fourth point in the second CAD model, a facility for checking for the existence of a grouping relationship, which is deemed to be satisfied if the second and fourth points are arranged within a third envelope geometry of a CAD group object in the second CAD model, and a facility for creating a hierarchical ordering within the engineering system, in which the first and the second CAD objects are hierarchically subordinate to the CAD group object.

A prerequisite for performing the method in accordance with the invention is acknowledge of the transformation methodology with which points of a CAD object that represents a component X can be mapped onto points of another CAD object which represents the same component X and is an element in another CAD model. In the simplest case, the transformation methodology can be one which maps the coordinates of the points of the one CAD object one-to-one, i.e., unchanged, onto coordinates of the other CAD object. This could be the case, for example, if the CAD models or CAD objects, as applicable, to which the transformation methodology must be applied, are generated in the same CAD software.

However, generation of CAD models or CAD objects in the same software will frequently not be the case. In general, the first and second CAD models will have been created in different CAD development environments. A frequent consequence of this is that the geometric arrangement of the points on the envelope curves in the CAD development environments concerned are different from each other. Here, however, there exists a unique transformation methodology, which identifies where points on one CAD object, which is assigned to a physical component, are to be found in another CAD software environment.

If no such transformation methodology is known, then it can be automatically deduced, for example, with the help of the method described in patent application No. PCT/EP2008/000784, which was not published at the filing date of the present application.

In accordance with an embodiment of the invention, using the above-described transformation methodology, a check is performed to determine whether the first and the second CAD objects are part of the CAD group object present in the second CAD model. To make this possible, the transformation methodology is first applied to the first point in the first envelope geometry of the first CAD object. The result of the transformation is the second point. The fourth point is calculated in an analogous way, in that the transformation is applied to the third point in the second envelope geometry of the second automation component.

It is in the nature of the transformation that the second point belongs to the same automation component in the second CAD model as does the first point in the first CAD model. An analogous situation pertains for the third and fourth points.

Following the transformation, a check is made to determine whether the results of the transformation, i.e., the second and fourth points, are arranged within the third envelope geometry of the CAD group object. If this is the case, it can be assumed that the third envelope geometry encloses the first and second CAD objects.

In this way, the engineering system in accordance with the invention automatically identifies that there is a grouping relationship between the CAD group object and the first and second CAD objects. The engineering system will now, again automatically, construct a corresponding hierarchical data structure, which was referred to in the introduction as a resource structure. Within this resource structure, it will be apparent to a user that the first and the second CAD objects are hierarchically subordinate to the CAD group object.

The engineering system in accordance with the invention is thus in a position to establish a connection between more abstract CAD objects, at a higher level of abstraction, and the specific embodiments of these CAD objects in a more detailed model. This task can be performed automatically by application of the transformation methodology and does not require, as with the conventional systems a user to effect it manually, and thus in a very error-prone manner. The automatically-created hierarchical resource structure makes it possible to synchronize, by use of the engineering system, changes to the CAD objects or CAD group objects, as applicable, made in the various source systems that are subordinate to the engineering system. The identification of the connections between subordinate CAD objects and superior CAD group objects is a prerequisite for enabling transfer and synchronization of data between individual modeling levels and domains of the digital factory.

In an advantageous embodiment of the invention, to make it easier for a user of the engineering system to obtain an overview, in particular, of a hierarchical structure in complex automation technology systems when a grouping relationship exists between a CAD group object and CAD objects, the hierarchical ordering is visualized within a graphical user interface of the engineering system by a resource label, and subresource labels which are, in particular, shown in indented positions. Here, the user can address the CAD group object on the user interface through the resource label, and the CAD objects through the subresource labels.

In performing the method in accordance with the invention, two situations can arise in which labels must be newly created within the engineering system after a grouping relationship has been identified.

Thus, in an advantageous embodiment of the invention, a new resource label is automatically created and assigned to the CAD group object if the grouping relationship exists and if no resource label has yet been created in the engineering system for the CAD group object.

However, it is also possible that the resource label already exists, but the subresource label has yet to be created within the engineering system. Hence, in accordance with another advantageous embodiment, subresource labels are automatically created and assigned to the CAD objects if the grouping relationship exists and if subresource labels have not yet been created for the CAD objects within the engineering system.

In yet another advantageous embodiment, the check for a grouping relationship can be effected very simply and comprehensibly if the first point is the center point of the first envelope geometry and the second point is the center point of the second envelope geometry.

As previously mentioned, numerous and highly diverse CAD development tools are frequently utilized, i.e., in the planning of complex automation technology systems, which can in extreme cases involve entire factories. In such application situations, the first and second CAD models frequently originate from different CAD systems. In accordance with an advantageous embodiment, the first CAD model is correspondingly present in a first CAD system and the second CAD model in a second CAD system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Below, the invention is described in more detail and explained by reference to exemplary embodiments illustrated in the Figures, in which.

DETAILED DESCRIPTION OF THE PREFERRED EMBODIMENTS

Figure 1:
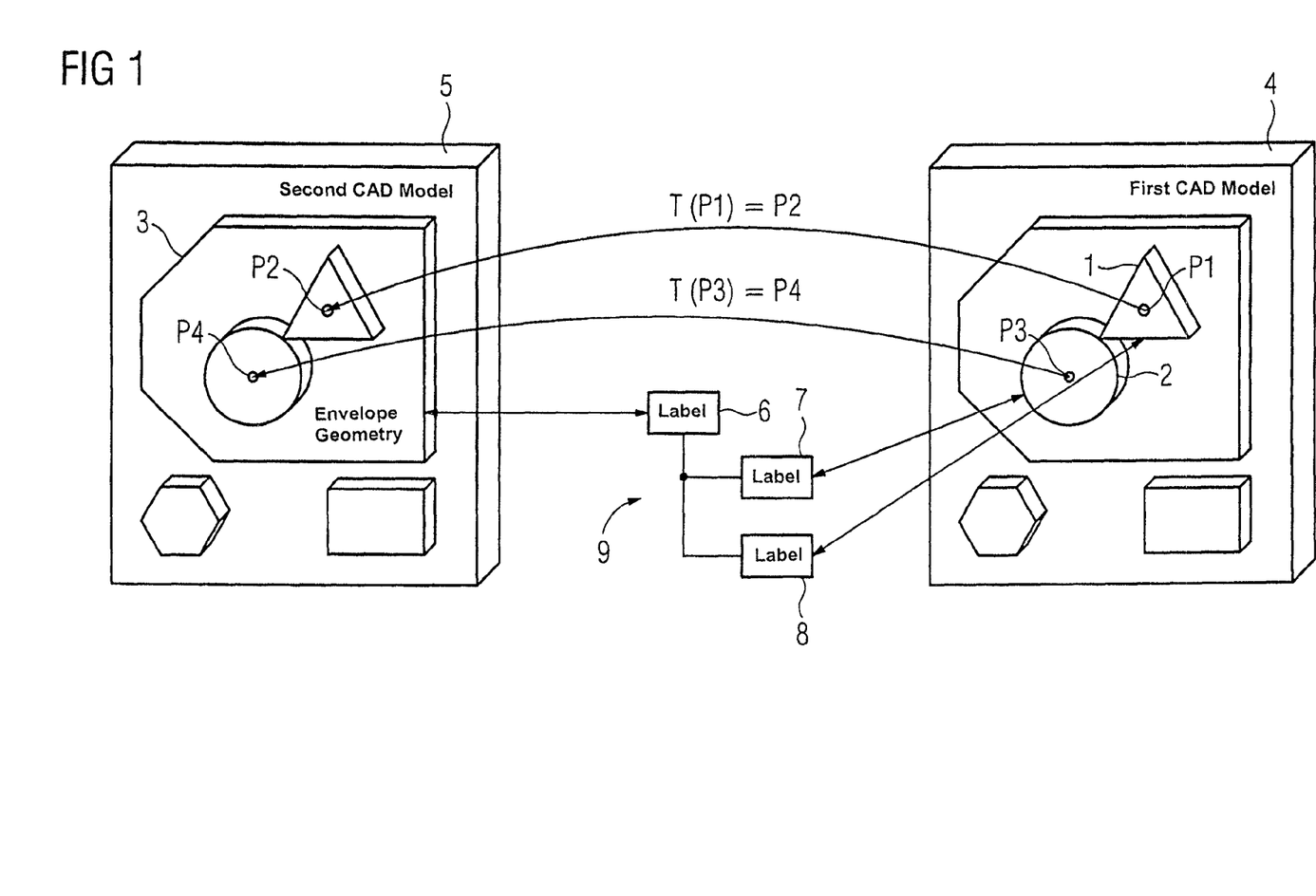
FIG. 1 is a schematic block diagram illustrating the method in accordance with an embodiment of the invention.

FIG. 1 shows a schematic block diagram illustrating the method in accordance with an embodiment of the invention. In the representation depicted here the CAD objects are shown in simplified form, represented by single geometric symbols. This representation has been chosen to make it easier to illustrate the essential steps of the method in accordance with the invention.

Assume now that an automation system is available in two CAD representations, i.e., in the form of a first CAD model 4 and a second CAD model 5. The underlying level of abstraction for these two CAD models 4, 5 is different. Thus, in the first CAD model a first and a second automation component are modeled by a first CAD object and a second CAD object. Here, the first CAD object is represented by a first envelope curve 1, while the second CAD object 2 is represented by a second envelope curve 2.

In the second CAD model 5 there are, on the other hand, no specific CAD objects for the first and second automation components. Instead, these two automation components are to be found as part of a third envelope geometry 3 in the second CAD model 5. Thus the second CAD model 5 has a higher level of abstraction than the first CAD model 4. Two models of this type of the same technical system could arise, for example, at different times in digital factory planning. Consequently, the more abstract second CAD model 5 would typically be produced in a very early planning phase, whereas the first more detailed CAD model 4 will be developed later in the planning process for the more specific layout of the individual automation components.

Thus, in the present scenario there is an envelope geometry in the second CAD model 5, i.e., the third envelope geometry 3, which completely encloses the envelope geometries 1, 2 of the first and second CAD objects. There is thus obviously a grouping relationship between the group object represented by the third envelope geometry 3 and the first and second CAD objects represented by the first and second envelope geometries 1, 2. Such a grouping relationship can be identified with the aid of the method in accordance with the invention.

For this purpose, a transformation methodology T is first applied to a first point P1 in the first envelope geometry 1 and to a third point P3 in the second envelope geometry 2. As the result of this transformation methodology, a second point P2 and a fourth point P4 is obtained in the second CAD model 5. An engineering system that is equipped to perform the method in accordance with the invention will now establish that both the second point P2 and the fourth point P4 are located within the third envelope geometry 3. Based on this, the engineering system assumes that a grouping relationship exists between the CAD group object represented by the third envelope geometry 3 and the first and second CAD objects. Consequently, the engineering system creates a hierarchical ordering 9 in which a first subresource label 8 which identifies the first CAD object, and a second subresource label 7 which identifies the second CAD object, are hierarchically subordinate to a resource label 6 which is assigned to the CAD group object. Finally, so that it can be identified by a user the engineering system shows a hierarchical ordering of this type on a graphical user interface in the form of a file tree.

In the creation of the hierarchical ordering 9, there are various conceivable situations with which the engineering system can be confronted. In a first situation, the CAD objects and the CAD group object are already qualified in the engineering system, respectively with the appropriate subresource labels 7, 8 or the resource label 6. That is, these labels have already been created and assigned to the associated CAD components. However, the grouping relationship between the CAD objects and the CAD group object is initially not yet identified in the engineering system, and hence also not yet mapped as a hierarchical ordering 9. With such a starting position the engineering system will, when the method is performed, simply arrange the resource and subresource labels 6, 7, 8 respectively to correspond to the grouping relationship which has been identified.

In a second situation, only the first and second CAD objects have already been qualified, with the subresource labels 7, 8. The CAD group object, which is represented by the third envelope geometry 3 in the second CAD model 5, has not yet been qualified in the engineering system. That is, the resource label 6 has not yet been created in the engineering system. Here, the engineering system will, after having identified the grouping relationship, create a new resource label 6 and then create the hierarchical ordering 9.

In a third situation, prior to execution of the method, only the CAD group object has already been qualified in the engineering system, with the resource label 6. The subresource labels 7, 8 do not yet exist. After the grouping relationship has been identified, the engineering system will create the appropriate subresource labels 7, 8 and then generate the hierarchical ordering 9 shown.

Figure 2:
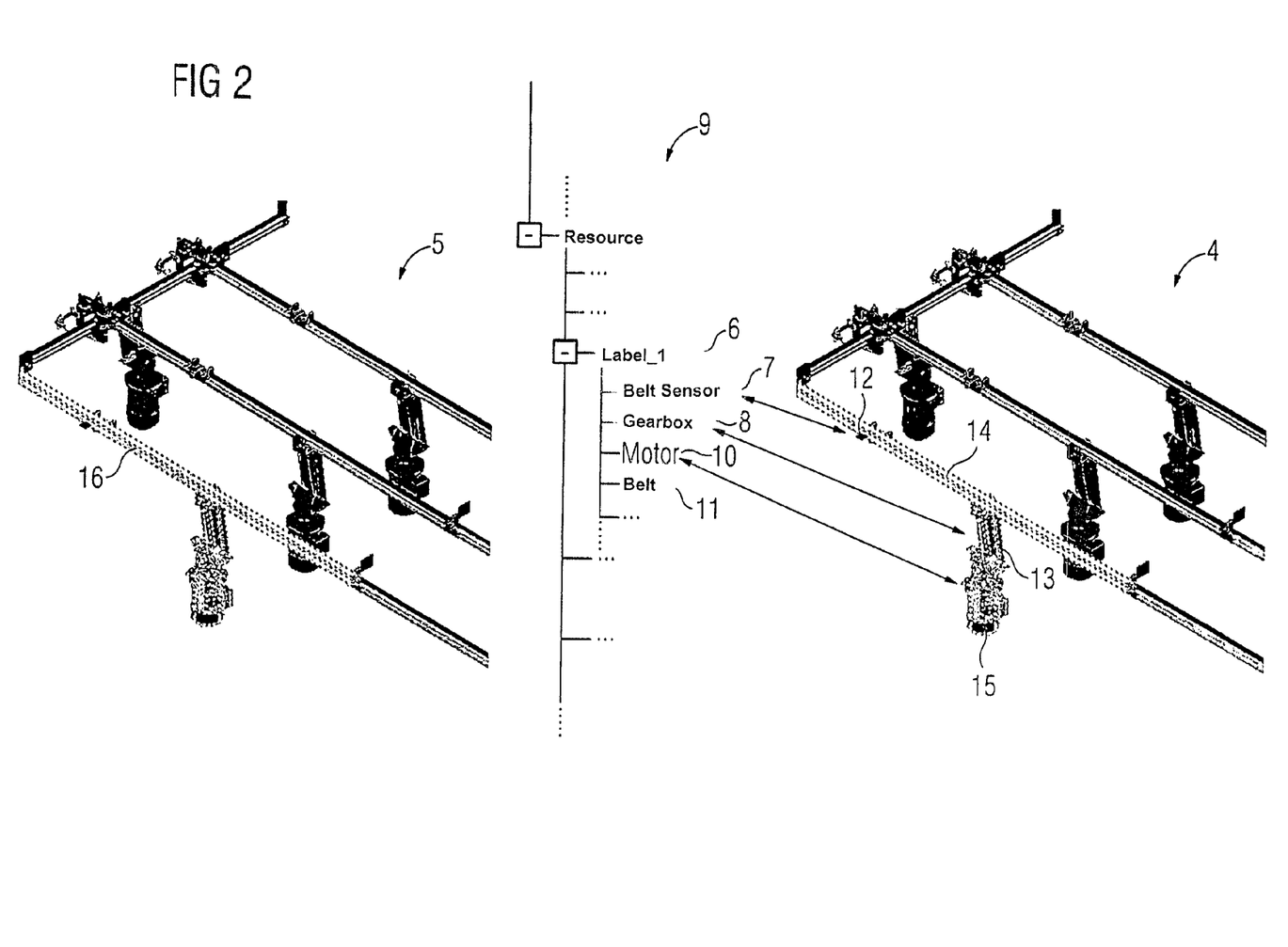
FIG. 2 is an illustration of an alternative embodiment of the method for effecting computer-assisted automated hierarchical assignment between CAD objects in two CAD models, which represent a belt conveyor.

FIG. 2 is an illustration of an alternative embodiment of the method for computer-assisted automated hierarchical assignment between CAD objects 12,13,14,15,16 in two CAD models 4,5 which represent a belt conveyor. Regarding the origination of the two CAD models 4,5, the following scenario is conceivable. First, a broad-brush concept for the automation technology system with the belt conveyor was created in a first CAD software system. In this broad-brush concept, the belt conveyor was initially regarded as one automation technology unit. In an engineering system which is superordinate to the two CAD systems, the elements of the broader-brush CAD model, referred to below as the second CAD model 5, were already known. For this purpose, the appropriate elements were qualified in the engineering system with labels. Consequently, a CAD group object 16, which represents the belt conveyor in the second CAD model, was qualified with a resource label 6 which reads "Conveyor".

In the course of the development process for the automation technology system, the second CAD model 5 was exported into another CAD system to develop further details for the automation components present in the second CAD model 5. Consequently, in this other CAD model another CAD model arises describing the same automation technology system, this being referred to below as the first CAD model 4. Instead of an abstract drawing for the belt conveyor, the first CAD model 4 now contains much more precise information about its construction. As a result, for example, the individual components of the conveyor belt are now specified instead by components from product catalogs. The conveyor belt is now specified by numerous manufacturer-specific elements, which now appear in place of the generalized abstract modeling of the conveyor belt by the CAD group object 16. So in the first CAD model 4 the conveyor belt is now specified by individual CAD objects 12,13,14,15, of which a first CAD object 12 represents a belt sensor, a second CAD object 13 represents a gearbox on the belt conveyor, a third CAD object 15 represents a motor for the belt conveyor and finally a fourth CAD object 14 represents the belt itself.

The more detailed first CAD model 4 thus created is then to be made known again in the engineering system, with the aim of synchronizing the data items which specify the same automation components. This operation, in which hierarchical dependencies are also to be identified, can be performed automatically using the engineering systems. To this end, one form of embodiment of the method in accordance with the invention is used to investigate which elements of the new first CAD model 4 have a spatial match with objects in the original second CAD model 5. In doing this, the system identifies that the CAD objects 12,13,14,15, or the center points of their envelope geometries, as applicable, are enclosed by the envelope geometry of the CAD group object 16. To make this possible, a transformation is applied which maps the center points of the envelope geometries of the CAD objects 12,13,14,15 onto corresponding points in the same automation components in the second CAD model 5.

Because the individual CAD objects 12,13,14,15 were not initially qualified in the engineering system, the engineering system automatically created for each of these CAD objects 12,13,14,15 a subresource label 7, 8, 10, 11 respectively, where the first subresource label 7 bears the name "Belt sensor", the second subresource label 8 bears the name "Gearbox", the third subresource label 10 bears the name "Motor" and finally the fourth subresource label 11 bears the name "Belt". Because the engineering system has identified the grouping relationship, by checking the positions of the center points of the CAD objects 12,13,14,15 involved, or their envelope geometry, as applicable, it has put the resource label 6 and the subresource labels 7, 8, 10, 11 directly in a hierarchical ordering 9, for which the subresource labels 7, 8, 10, 11 will be shown with an indentation under the resource label 6. In this way, the grouping relationship which has been identified is directly visualized for the user of the engineering system.

Within the engineering system, the individual models from the different stages of detailing are in this way grouped together into a logical relationship which is advantageous for subsequent additional work.

Figure 3:
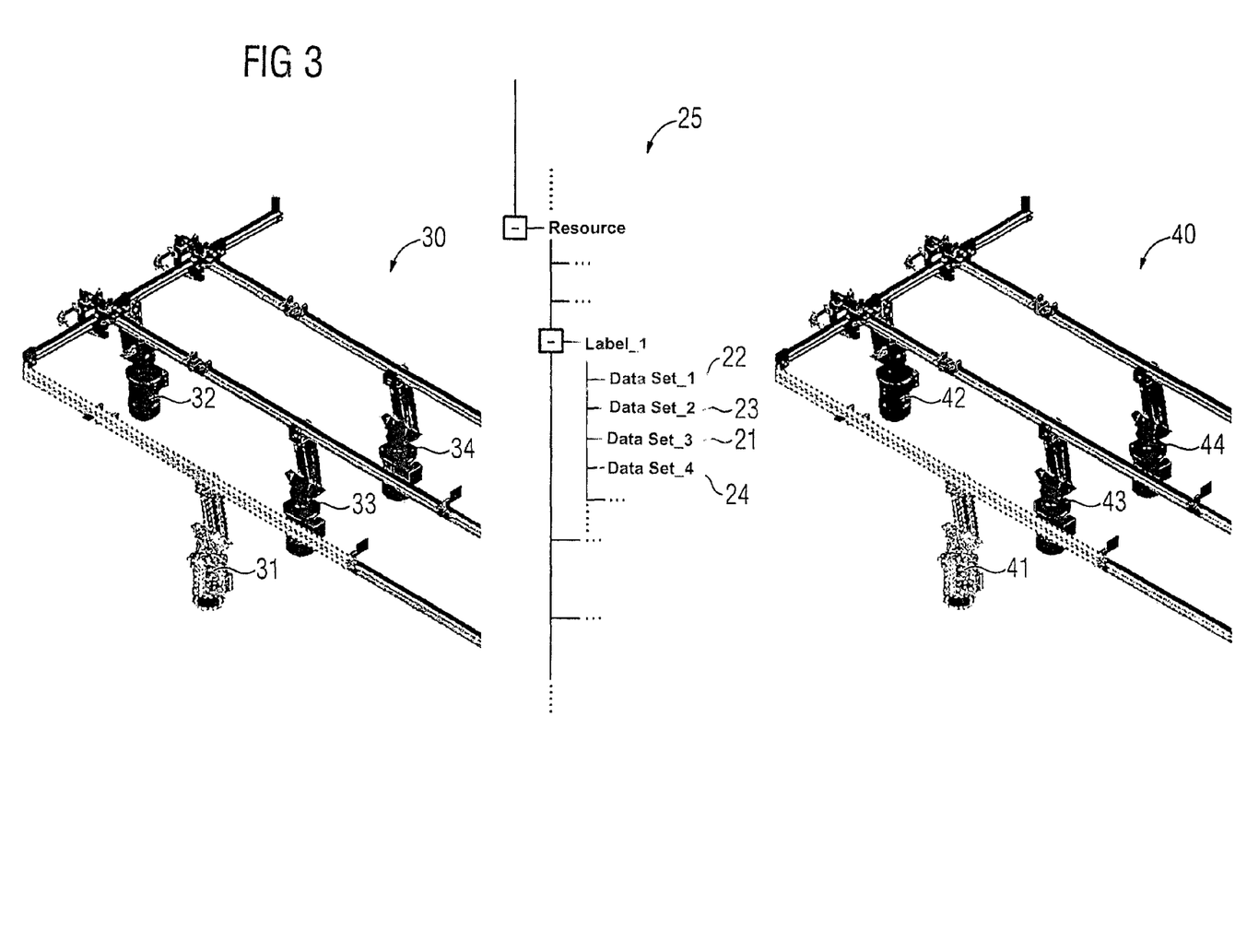
FIG. 3 is an illustration of a qualification of a first CAD object in a first 3-dimensional CAx system with a dataset with which a second CAD object has already been qualified in a second 3-dimensional CAx system.
Figure 4:
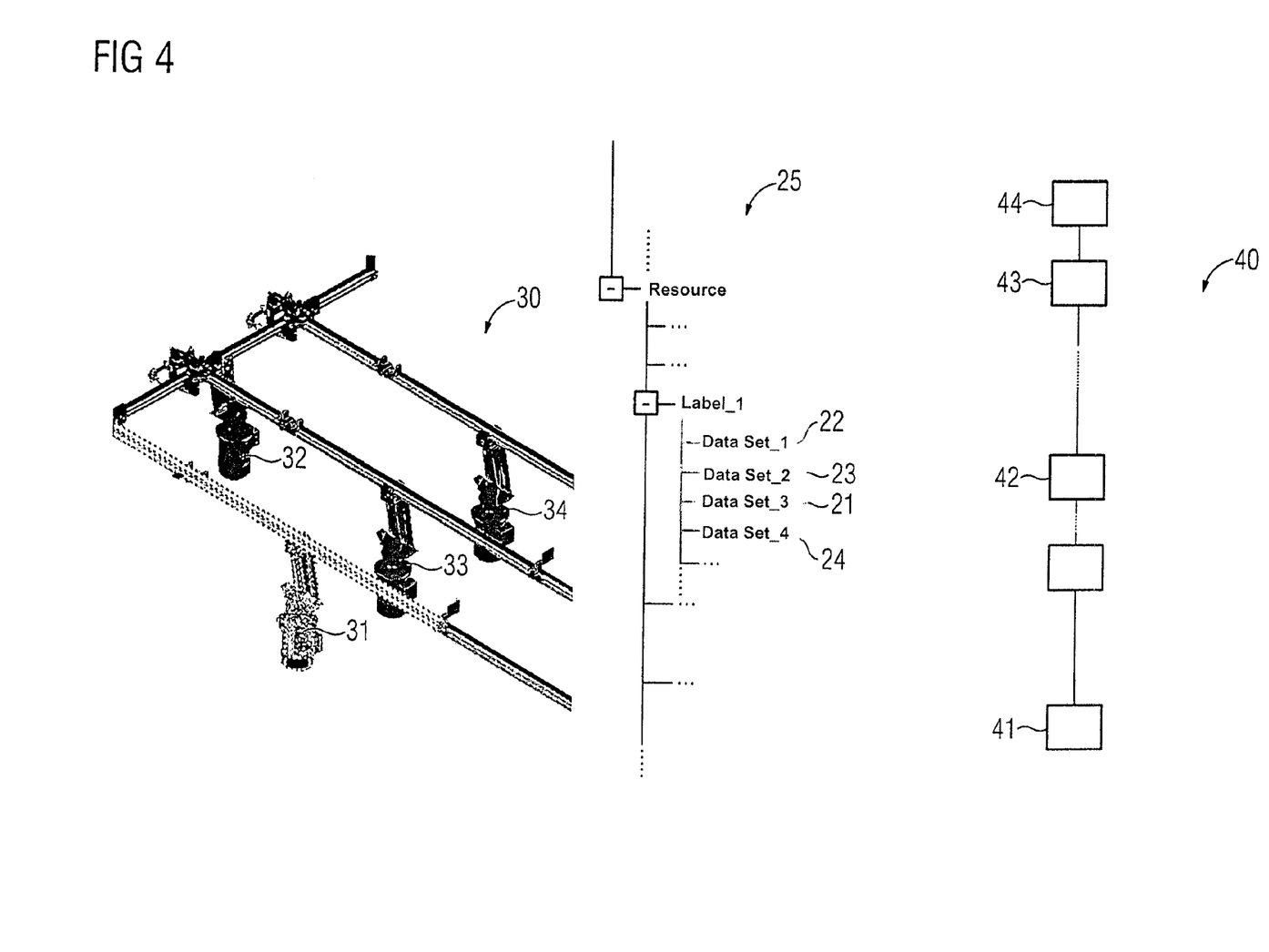
FIG. 4 is an illustration of a qualification of a first CAD object in a first 3-dimensional CAx system with a dataset with which a second CAD object has already been qualified in a second 2-dimensional CAx system.
Figure 5:
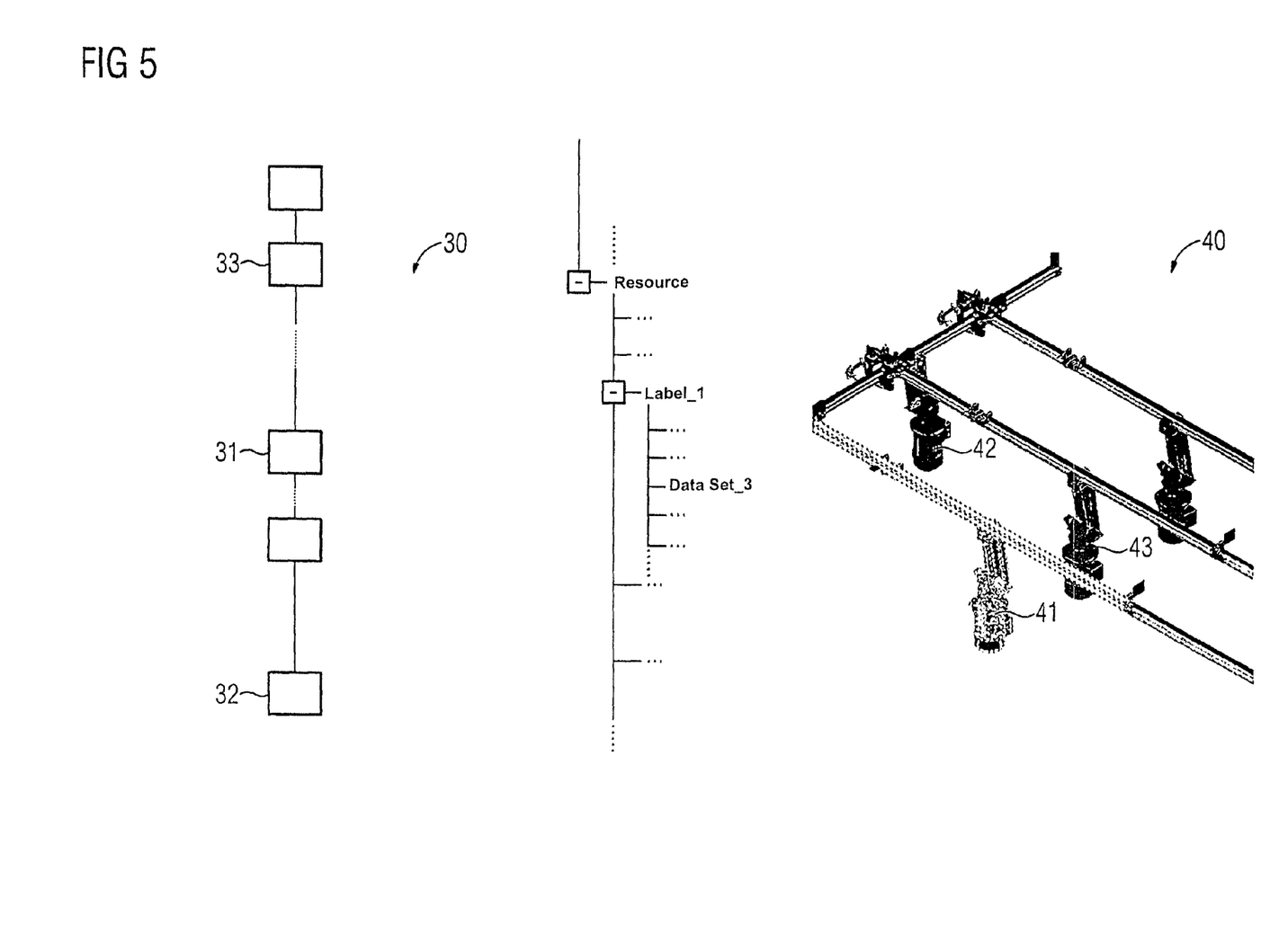
FIG. 5 is an illustration of a qualification of a first CAD object in a first 2-dimensional CAx system with a dataset with which a second CAD object has already been qualified in a second 3-dimensional CAx system.

What follows is to show, by reference to FIGS. 3 to 5, how the transformation methodology, if it is not already known to the system before the method is executed, can be automatically deduced with the help of the engineering system.

FIG. 3 is an illustration of the qualification of a first CAD element 31 in a first three-dimensional CAx system 30 with a dataset 21, with which a second CAD element 41 in a second three-dimensional CAx system 40 has already been qualified. As is generally the case, the abbreviation CAx stands for all "computer aided" systems. The "x" thus represents a placeholder. The CAx systems concerned are, for example, CAD or CAE systems. As is generally the case, the abbreviation CAD stands for "computer aided design". Hence, the term CAD systems refers to graphics-oriented computer programs, with which two- or three-dimensional layouts can be produced. The term CAE is used to represent "computer aided engineering" and refers to computer-assisted development work. This term is to be understood in a similar way to computer aided design, which is an element of CAE. However, CAE also includes, in addition to modeling and concept development, advanced analyses, simulations of many physical operations or optimization tools. Here, as everywhere in this document, the term "qualification" is to be understood as in a completely general way as the assignment of a dataset to a CAD object within a CAx system.

The two CAx systems 30,40 are CAD development environments. The first and second CAD development environments 30,40 are being used in the application example shown for the digital planning of an industrial manufacturing system. In each case, components of a conveyor system are shown, these being used for conveying products which are to undergo automated production. In both CAD development environments 30,40, the components of the automated system are modeled by three-dimensional envelope geometries.

Although, at first sight, the CAD models shown look the same, they do however relate to different CAD development environments with different functions. Thus in the first CAD development environment 30, modeling of the system has been undertaken to visualize very clearly for a user the simulation results from a simulation of the automation process. By contrast, the second CAD development environment 40 is used for the purpose of mechanical layout planning of the automation system. Accordingly, within the second CAD development environment 40, there is substantially more data for the individual system components to be modulated than is the case in the first CAD development environment 40. The first CAD development environment 30 can fall back on a down-spaced variant of the data models which are used in the second CAD development environment 40.

For uniformity of the data storage, a product data management system 25 is used which, in special forms, can also be an engineering system. Within this product data management system 25, are managed data records 21 ... 24, to which both the CAD development environments 30,40 have access. These data records 21,22,23,24 are assigned to the individual components of the automation system, which are also referred to as resources. The CAD elements 41,42,43,44, which are created in the second CAD development environment 40 for the purpose of modulating these resources, are already qualified with the appropriate data records 21,22,23, 24. Within the first CAD development environment 30, a first CAD element 31 is, on the other hand, not yet qualified with the appropriate data record 21. However, in the first CAD development environment 30 there are also three further components, which are modeled by further CAD elements 32,33, 34, where these further first CAD elements 32,33,34 have already been qualified with further data records 22,23,24. In summary, there are then at least three components of the automation system which are qualified in both CAD development environments 30,40. These three components are sufficient to determine a general transformation methodology with which it is possible to calculate for each CAD element 41,42,43,44 in the second CAD development environment 40 the coordinates of a CAD element 31,32,33,34, within the first CAD development environment 30, which describes the same component of the automation system. This transformation methodology is a linear mapping in accordance with the relationship:

$$\begin{pmatrix} A_1 \\ A_2 \\ A_3 \end{pmatrix} = \begin{pmatrix} x_{11} & x_{12} & x_{13} \\ x_{21} & x_{22} & x_{23} \\ x_{31} & x_{32} & x_{33} \end{pmatrix} \cdot \begin{pmatrix} B_1 \\ B_2 \\ B_3 \end{pmatrix}$$

Here, the coordinates $A_1$-$A_3$ refer to a point on a CAD element 31,32,33,34 in the first CAD development environment 30 and the coordinates $B_1$-$B_3$ refer to a point on a CAD element 21,22,23,24 within the second CAD development environment 40. From the three known components Drive_1, Drive_2 and Drive_4 it is now possible to determine the mapping matrix X. To this end, it is only necessary to solve an appropriate system of equations using known methods from linear algebra.

For the coordinates of the other components, which are already qualified in both CAD development environments 30,40 when the method starts, it is possible to use the center points of each of the envelope curves associated with the CAD elements 32,33,34,42,43,44. If these points, for each CAD element 32, 33,34,42,43,44 which has already been qualified, are used in setting up the system of equations to be solved, then a transformation matrix X is obtained with which it is possible to calculate the center points of CAD elements 31 in the first CAD development environment 30, which have not yet been qualified, from the center points of the associated CAD elements 41 in the second CAD development environment 40. By this calculation, the CAD elements in the first CAD development environment 30 can be identified and then qualified.

FIG. 4 is an illustration of the qualification of a first CAD element 31 in a first three-dimensional CAD development environment 30 with a dataset 21, with which a second CAD element 21 in a second two-dimensional CAD development environment 40 has already been qualified. Both of the CAx development environments 30,40 are CAD development environments. In the example shown here, the second CAD development environment 40, in which all the CAD elements 41-44 have already been qualified with datasets 21,22,23,24, is a two-dimensional CAD system, which is provided solely for arranging the associated components schematically, in order to formulate and simulate a control strategy. Here, it is also assumed, similarly to the situation in FIG. 3, that a first CAD element 11 in the first CAD development environment 30 has not yet been qualified with the dataset 21, with which a second CAD element 41 in the second CAD development environment 40 has already been qualified. On the other hand, three further components have already been qualified both in the first and in the second CAD development environment 30,40 with the appropriate further datasets 22,23,24.

Here again, the need is initially to determine a general mapping algorithm, which maps points on CAD elements 41,42,43,44 in the second CAD development environment 40 onto points on CAD elements 31,32,33,34 in the first CAD development environment 30 which specify the same components or which should be qualified with the same datasets 21,22,23,24, as applicable. The appropriate mapping methodology is according to the relationship below, where $A_1$-$A_3$ again specify the coordinates of a point in the first CAD development environment 30 and $B_1$-$B_2$ stand for coordinates of a point in the second CAD development environment 40:

$$\begin{pmatrix} A_1 \\ A_2 \\ A_3 \end{pmatrix} = \begin{pmatrix} x_{11} & x_{12} \\ x_{21} & x_{22} \\ x_{31} & x_{32} \end{pmatrix} \cdot \begin{pmatrix} B_1 \\ B_2 \end{pmatrix}$$

Solving this matrix relationship again requires at least three further components which are qualified in both CAD development environments 30,40. In this way, six relationships are obtained which can be used to solve for the unknowns $x_{11}$, $x_{12}$, $x_{21}$, $x_{22}$, $x_{31}$, $x_{32}$.

Finally, FIG. 5 is an illustration of the qualification of a first CAD element 31 in a first two-dimensional CAx development environment 30 with a dataset 21, with which a second CAD element 41 has already been qualified in a second three-dimensional CAx development environment 40. The two CAx systems 30,40 are once again CAD development environments. The situation assumed here is now the reverse of the application situation illustrated in FIG. 4, i.e., all the components of the automation system which is to be modulated have been qualified in the three-dimensional second CAD development environment 40. In the first CAD development environment 30, on the other hand, only two components of the automation system have already been qualified. A general mapping methodology can be specified by the following equation, where $A_1$-$A_2$ again specify the coordinates of a point in the first CAD development environment and $B_1$-$B_3$ stand for the coordinates of a point in the second CAD development environment 40:

$$\begin{pmatrix} A_1 \\ A_2 \end{pmatrix} = \begin{pmatrix} x_{11} & x_{12} & x_{13} \\ x_{21} & x_{22} & x_{23} \end{pmatrix} \cdot \begin{pmatrix} B_1 \\ B_2 \\ B_3 \end{pmatrix}$$

This mapping methodology shows that calculating the six unknown matrix components here requires only two components which are qualified in both CAD development environments 30,40.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for a computer-assisted automated hierarchical assignment of computer aided design (CAD) objects in a first CAD model of an automation technology system to CAD group objects in a second CAD model of the automation technology system with an engineering system equipped for hierarchically structured data management for CAD objects and CAD group objects, wherein the engineering system utilizes a transformation methodology that maps points on a component of the automation technology system modeled in the first CAD model onto points of a same component in the second CAD model, the method comprising:

applying the transformation methodology to at least one first point of a first envelope geometry for a first CAD object representing a first automation component in the first CAD model to calculate a second point in the second CAD model, and to at least one third point of a second envelope geometry for a second CAD object representing a second automation component in the first CAD model to calculate a fourth point in the second CAD model;

checking to determine an existence of a grouping relationship, said determination being satisfied if the second and the fourth point are arranged within a third envelope geometry for a CAD group object in the second CAD model; and if the grouping relationship is determined to exist, then creating a hierarchical ordering within the engineering system in which the first and the second CAD objects are hierarchically subordinate to the CAD group object.

2. The method as claimed in claim 1, wherein, if the grouping relationship exists, visualizing the hierarchical ordering between the CAD group object and the first and second CAD objects within a graphical user interface of the engineering system by displaying a resource label having indented first and second subresource labels, and wherein the CAD group object is addressable by an associated resource label and the CAD objects are addressable by associated first and second subresource labels by a user with the graphical user interface.

3. The method as claimed in claim 2, wherein a new resource label is automatically created and assigned to the CAD group object if the grouping relationship exists and if a resource label for the CAD group object has not yet been created within the engineering system.

4. The method as claimed in claim 3, wherein new subresource labels are automatically created and assigned to the first and the second CAD objects if the grouping relationship exists and if subresource labels for the first and second CAD objects have not yet been created within the engineering system.

5. The method as claimed in claim 1, wherein the first point is a center point of the first envelope geometry and the third point is the center point of the second envelope geometry.

6. The method as claimed in claim 1, wherein the first CAD model is within a first CAD system and the second CAD model is within a second CAD system.

7. An engineering system for a computer-assisted, automated hierarchical assignment of computer aided design (CAD) objects in a first CAD model of an automation technology system to CAD group objects in a second CAD model of the automation technology system, the engineering system being equipped for hierarchically structured data management for the CAD objects and CAD group objects and being equipped to implement a transformation methodology which maps points on a component of the automation technology system modeled in the first CAD model onto points of a same component in the second CAD model, the engineering system comprising:

a facility for applying the transformation methodology to at least one first point of a first envelope geometry for a first CAD object representing a first automation component in the first CAD model to calculate a second point in the second CAD model, and to at least one third point of a second envelope geometry for a second CAD object representing a second automation component in the first CAD model to calculate a fourth point in the second CAD model;

a facility for checking to determine existence of a grouping relationship, determination being satisfied if the second and fourth points are arranged within a third envelope geometry for a CAD group object in the second CAD model, and a facility for creating a hierarchical ordering within the engineering system in which the first and the second CAD objects are hierarchically subordinate to the CAD group object.

8. The engineering system as claimed in claim 6, wherein the engineering system incorporates a graphical user interface which is equipped, in an event that a grouping relationship exists, to visualize the hierarchical ordering between the CAD group object and the first and second CAD objects by displaying a resource label having indented first and second subresource labels, and wherein the CAD group object is addressable by an associated resource label and the CAD objects are addressable by associated first and second subresource labels by a user with the graphical user interface.

9. The engineering system as claimed in claim 7, wherein the engineering system is equipped automatically to create a new resource label and assign the new resource label to the CAD group object if the grouping relationship exists and a resource label for the CAD group object has not yet been created within the engineering system.

10. The engineering system as claimed in claim 8, wherein the engineering system is equipped automatically to create new first and second subresource labels and assign the new first and second subresource labels to the first and second CAD objects if the grouping relationship exists and subresource labels for the first and second CAD objects have not yet been created within the engineering system.

11. The engineering system as claimed in claim 8, wherein the engineering system is equipped automatically to create new first and second subresource labels and assign the new first and second subresource labels to the first and second CAD objects if the grouping relationship exists and subresource labels for the first and second CAD objects have not yet been created within the engineering system.

12. The engineering system as claimed in one of the claim 6, wherein the first point is a center point of the first envelope geometry and the third point is the center point of the second envelope geometry.

13. The engineering system as claimed in one of the claim 6, wherein the first CAD model is within a first CAD system and the second CAD model is within a second CAD system.

* * * * *